March 22, 1960 R. D. TORREY 2,929,938

MAGNETIC AMPLIFIERS

Filed Jan. 25, 1957 2 Sheets-Sheet 1

INVENTOR.
Robert D. Torrey

BY

Charles C. English

AGENT

March 22, 1960 R. D. TORREY 2,929,938

MAGNETIC AMPLIFIERS

Filed Jan. 25, 1957 2 Sheets-Sheet 2

INVENTOR.
Robert D. Torrey
BY
Charles C. English
AGENT 2,929,938
Patented Mar. 22, 1960

2,929,938

MAGNETIC AMPLIFIERS

Robert D. Torrey, Philadelphia, Pa., assignor to Sperry Rand Corporation, New York, N.Y., a corporation of Delaware Application January 25, 1957, Serial No. 636,257

16 Claims. (Cl. 307—88)

The present invention relates to improved magnetic amplifiers, particularly of the pulse type, and is primarily concerned with series type magnetic amplifiers having improved input and output circuits whereby the effects of diode enhancement and winding inductance are materially reduced.

As is well known at the present time, pulse type magnetic amplifiers may be caused to exhibit both complementing and non-complementing operation whereby such amplifiers find considerable utility in various control applications, particularly in conjunction with computer circuits. Typical such amplifiers are described, for instance, in Steagall Patent No. 2,709,798, issued May 31, 1955, for: "Bistable Devices Utilizing Magnetic Amplifiers." In general, such amplifiers are characterized by the provision of a magnetic core preferably but not necessarily comprising a material exhibiting a substantially rectangular hysteresis loop; and the said core carries an input and an output winding thereon. Typical circuits, for instance of the type described in the aforementioned Steagall patent, utilize an alternating energizing source coupled to one end of said output winding for selectively producing output signals in an output circuit coupled to the other end of said output winding, under the control of selective input signals applied to said input winding; and in particular; the said input signals serve to select the hysteretic region over which the core operates during application of drive from the aforementioned alternating source, whereby the output winding selectively exhibits a relatively high or a relatively low impedance to driving excursions of said alternating source. As will be appreciated from a study of Steagall Patent No. 2,709,798, the series circuit comprising the aforementioned alternating energizing source, output winding, and output circuit, normally includes a rectifier whereby predetermined polarity excursions of the alternating source act as driving excursions, and opposite polarity excursions of said alternating source act as blocking excursions which serve to disconnect the energizing source from the output winding. These blocking excursions of the alternating source may produce undesirable enhancement or reverse transient currents through the said rectifier when the rectifier comprises a semiconductor; and this enhancement effect is particularly pronounced when the energizing source exhibits a substantially squarewave output. Such squarewave energizing sources also tend to produce appreciable losses in the winding inductances of the amplifier. A reduction of enhancement effects as well as a reduction in winding inductance losses can be realized through the utilization of a sinewave energization source; or, in general, through the utilization of an alternating energization source which does not exhibit abrupt reversals in polarity.

A further characteristic of series type amplifiers, generally of the form described in Steagall Patent No. 2,709,798, is, as mentioned previously, that one-half of the power pulse excursion tends to act as a blocking source; and due to the actual operation of pulse type amplifiers, it has been found that the blocking excursion of the alternating source should be larger than the driving excursion of that source. The reasons for this particular requirement, as well as typical circuits for producing an effectively asymmetrical energizing source, are described in detail in the prior copending application of William F. Steagall, Serial No. 589,426, filed June 5, 1956, for: "Asymmetrically Energized Magnetic Amplifiers;" now Patent No. 2,834,894, and it may be said as a general rule, that substantially improved operation of series type magnetic amplifiers may be achieved by means producing a potential shift between the average potential level of the alternating energizing sources and the output reference potential level of the amplifier output. A feature of the present invention produces this relative asymmetry in the energizing source in an improved manner; and in particular, by utilizing an auxiliary blocking source in the output circuit of the amplifier.

It has further been found, in the operation of both complementing and non-complementing amplifiers particularly of the pulse type, that the amplifier input should be disconnected from the source of input pulses during application of drive to the amplifier; and in the past, the systems employed for effecting this disconnection have often been less than completely effective, whereby input signals tend to be coupled to the amplifier input winding at undesired times. In accordance with still another feature of the present invention, therefore, improved blocking effects at the amplifier input are achieved through the utilization of an input circuit which employs the power pulse source itself for producing an input blocking effect at desired times.

In general, it may be said that the present invention contemplates the provision of improved magnetic amplifiers having novel input and output circuits, whereby various undesirable effects observed in magnetic amplifiers suggested heretofore are substantially completely eliminated.

It is accordingly an object of the present invention to provide improved pulse type magnetic amplifiers.

Another object of the present invention resides in the provision of improved pulse type magnetic amplifiers wherein the effects of diode enhancement and winding inductance are materially reduced.

Still another object of the present invention resides in the provision of improved magnetic amplifier circuits which need not employ a number of D.C. voltage supply sources considered necessary heretofore.

A further object of the present invention resides in the provision of an improved input circuit for use with magnetic amplifiers, particularly of the pulse type, which circuit effectively utilizes an amplifier driving source for selectively disconnecting the amplifier input from an input source at appropriate times.

Still another object of the present invention resides in the provision of improved complementing and non-complementing magnetic amplifier circuits which may be made in relatively small sizes.

In providing for the foregoing objects and advantages, the present invention contemplates the provision of improved magnetic amplifier circuits exhibiting non-complementing and complementing operation; and these circuits, in general, comprise a magnetic core having an input and an output winding thereon. A source of energizing potential is coupled to one end of the said output winding; and in accordance with the present invention, this source preferably is a sine wave or has an output waveform which does not include abrupt reversals of potential. The said energizing source serves to produce output pulses at the other end of said output winding in dependence upon the impedance of said output winding; and the said energizing source is caused to exhibit effective asymmetry, whereby the blocking halves thereof are larger than the power halves thereof, through the use of an auxiliary blocking source coupled to the said other end of the output winding. As will be described subsequently, the said blocking source is in phase opposition to the energizing source, whereby it aids the blocking effect of the energizing source at appropriate times.

The said amplifier input winding is in turn coupled to a source of selective input pulses which control the hysteretic region over which the core operates during application of drive thereto, thereby in turn to control the effective impedance of the output winding during drive; and the said input source is preferably coupled to the said input winding via rectifier means. The said input winding is also coupled via an improved impedance network to the aforementioned source of energizing pulses, whereby the said energizing source acts not only to effect drive to the amplifier but also acts to block the input during application of such drive. In addition, and particularly when the amplifier is to exhibit non-complementing operation, the aforementioned auxiliary source of blocking pulses may be coupled to the input winding whereby it cooperates with the energizing source and with the aforementioned improved impedance network to selectively effect reverting current in the amplifier at appropriate times.

By this arrangement, diode enhancement effects and spurious amplifier operation, due to insufficient blocking of the output rectifier, are completely avoided; and in addition, the cooperative use of energizing and blocking pulse sources permits the elimination of a number of separate high power D.C. supplies considered necessary heretofore. It should further be noted that by avoiding use of energizing sources exhibiting abrupt reversals in polarity, losses in the winding inductances are materially reduced; and in fact when a sine wave source is employed, much of the stored energy in the winding inductances is recovered during amplifier operation.

The foregoing objects, advantages, construction and operation of the present invention will become more readily apparent from the following description and accompanying drawings, in which.

Figure 1:
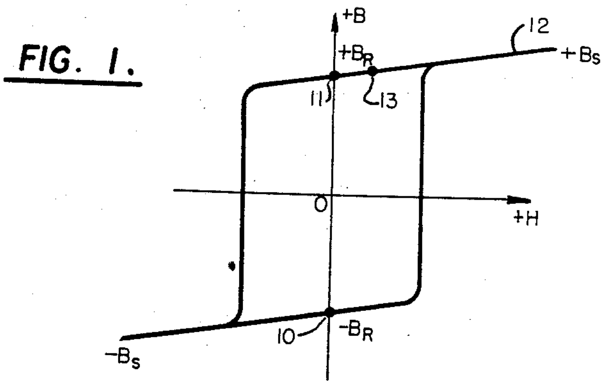
Figure 1 is an idealized hysteresis loop of one form of magnetic material which is preferably but not necessarily employed in the practice of the present invention.
Figure 2:
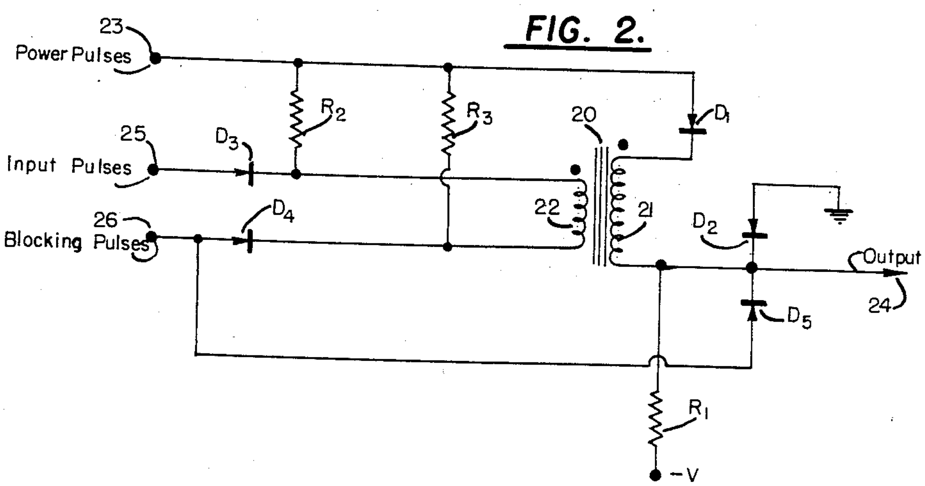
Figure 2 is a schematic diagram of an improved pulse type, series magnetic amplifier exhibiting non-complementing operation in accordance with the present invention.
Figure 3:
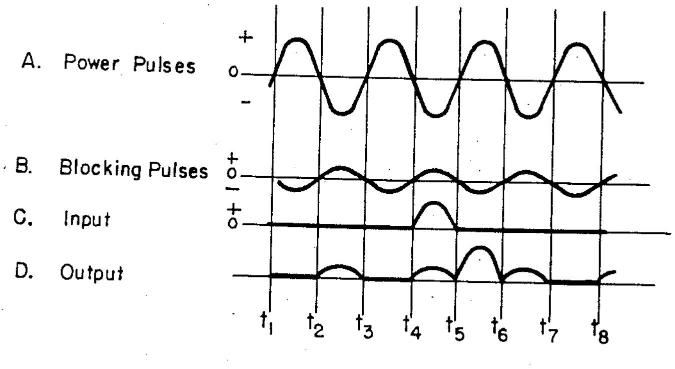
Figure 3 (A through D) are waveform diagrams illustrating the operation of the circuit shown in Figure 2.

Referring now to Figures 1 through 3, it will be seen that, in accordance with the present invention, an improved magnetic amplifier exhibiting non-complementing operation may comprise a core 20 utilizing a magnetic material, preferably but not necessarily exhibiting a substantially rectangular hysteresis loop of the type illustrated in Figure 1. The core 20 may in fact assume a number of physical configurations, and the hysteretic characteristic of the said core may similarly assume a number of different forms not limited to rectangularity.

In this respect attention is invited to the aforementioned Steagall Patent No. 2,709,798, for possible variations in both the core configurations and hysteretic characteristics; and it will be understood that these variations apply with equal force to the several embodiments of the present invention. The terms "complementing" and "non-complementing," as well as the general operation of series pulse type magnetic amplifiers of the type contemplated herein, are also discussed in the aforementioned Steagall Patent No. 2,709,798; and this patent is accordingly incorporated herein by reference, to more fully describe certain structures and operations which are characteristic of my improved amplifiers.

Core 20 carries a power or output winding 21 thereon, and further carries a signal or input winding 22. One end of the said power winding 21 is coupled via a rectifier D1 to a source 23 of alternating energizing potential (see Figure 3A); and the said source 23 preferably exhibits a substantially sinusoidal or other alternating output, not having abrupt reversals in polarity. The lower end of output winding 21 is coupled to an output point 24, and a sneak suppressor or clamp circuit, comprising a constant current source —V, R1 and a rectifier D2, is coupled to the output of the amplifier, thereby to selectively establish a reference level of ground potential at said output. The operation of sneak suppressors, generally of the type comprising rectifier D2 and its associated constant current source, is described in said Steagall Patent No. 2,709,798.

Input winding 22 has the upper end thereof coupled via a rectifier D3 to a source 25 of selective input pulses (see Figure 3C); and the lower end of winding 22 is coupled via a further rectifier D4 to a source 26 of regularly occurring blocking pulses (see Figure 3B). In addition, the upper and lower ends of winding 22 are coupled respectively via current limiting resistors R2 and R3 to a common output terminal of power pulse source 23, whereby resistors R2 and R3 form an impedance network associated with power pulse source 23 which appreciably improves the input operation of the circuit in a manner which will be described.

The output of blocking pulse source 26 is of the same frequency as that of the power pulse source 23, and is also preferably sinusoidal in waveform. Blocking pulse source 26 has a lower peak-to-peak amplitude than that of power pulse source 23; and in addition, is in phase opposition to said power pulse source 23, whereby it cooperates with source 23, in a manner which will be described, to selectively effect reverting current in the amplifier at appropriate times. In addition, blocking pulse source 26 is coupled to the output circuit of the amplifier via still another rectifier D5, and as will appear subsequently, the phase opposition of source 26 to source 23 causes the two sources to further cooperate with one another in the output circuit of the amplifier thereby to increase the blocking effect of predetermined potential excursions of the said power pulse source 23.

The general operation of the circuit shown in Figure 2 will be more readily appreciated by examination of the waveforms shown in Figure 3, taken in conjunction with the hysteresis loop of Figure 1. In this respect, let us initially assume that core 20 is at its minus remanence point 10 (see Figure 1), at time *t1*. Power pulse source 23 exhibits a positive-going sinusoidal excursion during the time interval *t1* to *t2* (Figure 3A), whereby current is driven via rectifier D1 and output winding 21 toward the output point 24. During this initial state of operation, core 20 tends to be driven from its minus remanence point 10 to its plus remanence point 11, whereby output winding 21 exhibits a relatively high impedance to the driving pulse. As a result, substantially all the energy of the applied power pulse during the time interval *t1* to *t2* is expended in flipping the core, whereby only a sneak output at best appears at output point 24 and this sneak output is completely suppressed by operation of the output clamp circuit D2 and its associated constant current source —V, R1.

During this same time interval *t1* to *t2*, the full positive-going potential of the power pulse source 23 is applied via resistors R2 and R3 to the opposing ends of input winding 22, thereby to disconnect rectifiers D3 and D4; and, as a result, the input pulse source 25 as well as the blocking pulse source 26 is positively disconnected from input winding 22 during application of drive to the amplifier. The blocking pulse from source 26 is negative-going during the time interval $t1$ to $t2$ thereby to further assure that rectifier D4 is non-conductive during this time interval; and this negative-going blocking pulse also cuts off rectifier D5, whereby the blocking pulse source has no effect upon the output state of the amplifier. As a result, the output point 24 remains at substantially ground potential (see Figure 3D) during the time interval $t1$ to $t2$, and during this time interval the core 20 is caused to flip from its minus remanence point 10 to its plus remanence point 11.

During the time interval $t2$ to $t3$ (and assuming that no input pulse appears from source 25), the power pulse source 23 goes negative, thereby blocking rectifier D1. During this same time interval the blocking pulse source 26 goes positive, and the positive blocking pulse is applied to the output point 24 via rectifier D5 thereby raising the potential of output point 24 to the potential of the blocking source. This positive-going excursion at the lower end of winding 21 assures that rectifier D1 is disconnected during the entire time period required for core reversion, as will be described. Although the output point 24 tends to go slightly positive as a result of the application of the blocking pulse via rectifier D5 during the time interval $t1$ to $t2$, the positive-going potential at point 24 has no effect upon subsequent amplifier stages when a plurality of amplifiers of the type shown in Figure 2 are cascade-connected. This follows since such cascade-connected magnetic amplifiers are alternately energized by power pulses of opposing phases, whereby the time interval $t2$ to $t3$ represents a time interval at which the input circuit of the next subsequent amplifier is blocked by its associated power pulse source.

During this same time interval $t2$ to $t3$, the positive-going pulse from blocking source 26 effects current flow via rectifier D4, winding 22 and resistor R2, to the negative-going power pulse source 23; and due to the winding polarities illustrated in Figure 2, this upward flow of current in winding 22 causes core 20 to be reverted from its positive remanence point 11 to its negative remanence point 10 during the time interval $t2$ to $t3$.

During the next subsequent time interval $t3$ to $t4$, both the power pulse and blocking pulse sources reverse in polarity, whereby the operation of the amplifier during this particular time interval is similar to that already described in reference to the time interval $t1$ to $t2$; and core 20 is again driven to its positive remanence point 11. In short, so long as no input pulses appear from source 25, core 20 is caused to be regularly driven about its hysteresis loop, and output point 24 remains at substantially ground potential during each of the output time periods $t1$ to $t2$, $t3$ to $t4$, etc. of the amplifier.

If now an input pulse should be produced by input source 25 during the time interval $t4$ to $t5$, this input pulse will effect current flow via rectifier D3 and resistor R2 to the negative power pulse source 23, and will also effect input current via rectifier D3, winding 22, and resistor R3, to the said negative power pulse source 23. By appropriate choice of the resistances R2 and R3, the current tending to flow from input source 25 through winding 22 and resistance R3 to the power pulse source 23 may be caused to equal the current tending to flow from blocking pulse source 26 through winding 22 and resistor R2 to the said source 23 during this time interval $t4$ to $t5$; and since these two current flows are opposing, the application of an input pulse from source 25 will cause no resultant current to flow through winding 22 during the interval $t4$ to $t5$. As a result, core 20 is caused to remain substantially at its positive remanence point 11, whereby application of a further positive-going power pulse during the time interval $t5$ to $t6$ drives core 20 completely into its positive saturation region 12, thereby to effect an appreciable output pulse at output point 24 via the relatively low impedance output winding 21.

In the absence of another input pulse during time interval $t6$ to $t7$, the blocking pulse source 26 again cooperates with the power pulse source 23, in the manner already described, to revert the core to its minus remanence point 10, whereby the amplifier will no longer produce an output.

It will be appreciated from the foregoing, therefore, that the amplifier illustrated in Figure 2 achieves a usable output pulse only in response to application of an input pulse, whereby the said amplifier exhibits non-complementing operation. It will further be appreciated that the particular circuit shown in Figure 2 for achieving this non-complementing operation utilizes an improved input network cooperating with both the blocking and power pulse sources, whereby these sources serve to positively isolate the input winding from input sources during appropriate times; and serve further to provide reverting current through the input winding at appropriate times. In addition, the novel network employing a blocking pulse source in the output of the amplifier serves to insure that the blocking half of the power pulse is larger than the power half thereof, in a manner which is more efficient and more certain in its operation than others suggested heretofore. The use of sinusoidal energization and blocking pulse sources further results in decreased winding losses and tends to minimize enhancement effects which might otherwise occur when rectifier D1 comprises a semiconductor material.

Figures 4, 4A:
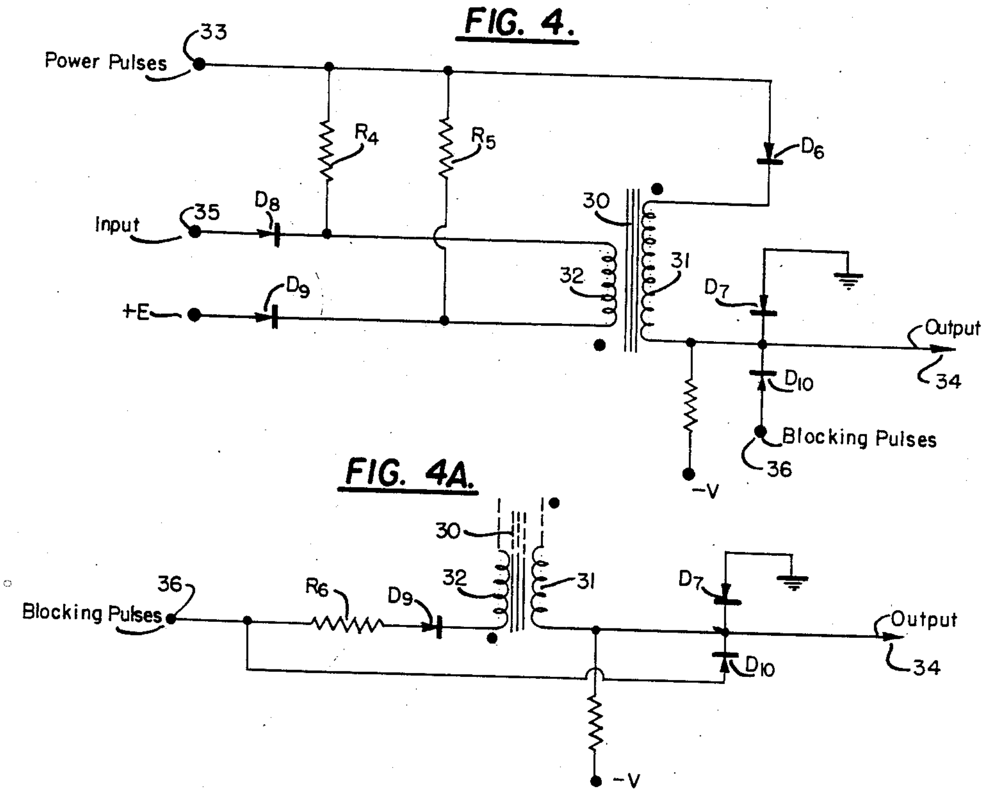
Figure 4 is a schematic diagram of an improved pulse type series magnetic amplifier exhibiting complementing operation, in accordance with the present invention.
Figure 4A is a partial schematic diagram of a modified circuit constructed in accordance with the embodiment of Figure 4.

The amplifier shown in Figure 2 may, by reversing the input winding, be caused to exhibit complementing operation; and a preferred circuit in this respect is illustrated in Figure 4. Thus, referring to Figure 4, it will be seen that an improved complementer constructed in accordance with the present invention may once more comprise a core 30, similar to the core 20, and core 30 has an output winding 31 and an input winding 32 thereon. The relative winding polarities of windings 31 and 32 are reverse to those of windings 21 and 22, already described.

The upper end of output winding 31 is coupled via a rectifier D6 to a power pulse source 33, and the lower end of winding 31 is coupled to an output point 34 which is, as before, selectively clamped at ground potential by a clamp or sneak suppressor circuit comprising rectifier D7 and an associated constant current source. The upper end of input winding 32 is coupled via rectifier D8 to a source of selective input pulses 35, and the lower end of winding 32 is coupled via still another rectifier D9 to a source of positive potential +E. In addition, the upper and lower ends of winding 32 are coupled via current limiting resistors R4 and R5, to a common output terminal of power pulse source 33. As before, a source of blocking pulses 36 is coupled to the output of the circuit via a rectifier D10.

Figure 5:
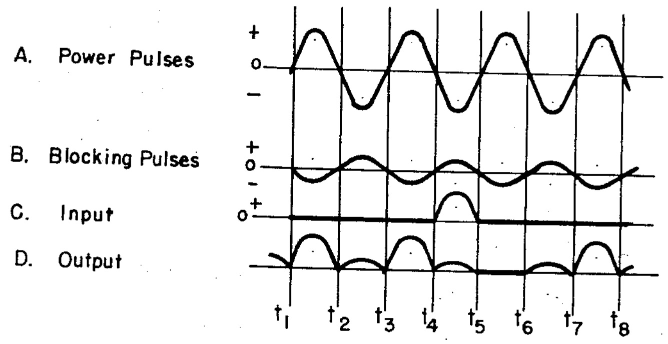
Figure 5 (A through D) are waveform diagrams illustrating the operation of the circuit shown in Figures 4 and 4A.

The operation of the circuit shown in Figure 4 is analogous to that already described in reference to Figure 2; and this operation will be more readily appreciated by examination of the waveforms shown in Figure 5, taken in conjunction with the hysteresis loop of Figure 1. Thus, if we should assume that at time $t1$ the core 30 is at plus remanence point 11, application of a positive-going power pulse from source 33 during the time interval $t1$ to $t2$ will effect appreciable current flow via rectifier D6 and via the relatively low impedance winding 31, whereby core 30 is driven from its plus remanence point 11 into its positive saturation region 12, thereby to produce an appreciable output pulse at terminal 34. During this same time interval, $t1$ to $t2$, the positive-going potential of power pulse source 33 is applied via resistors R4 and R5 to opposing ends of the input winding 32, thereby disconnecting rectifiers D8 and D9 and assuring that no input pulses can possibly be applied to the said input winding 32. The blocking pulse source 36 is negative-going during the time interval *t1* to *t2*, whereby rectifier D10 is also disconnected.

At time interval *t2* to *t3*, power pulse source 33 goes negative in potential, thereby disconnecting rectifier D6, and this disconnection of rectifier D6 is aided by the positive-going blocking pulse from source 36 which is coupled to the amplifier output 34 via rectifier D10. As before, the slight positive-going excursion of output point 34 will not effect subsequent amplifier stages, inasmuch as the next subsequent amplifier stage, for instance, will have its input positively blocked by the positive-going excursion of the power pulse source in this next subsequent stage, during the time interval *t2* to *t3*. During this same time interval *t2* to *t3*, a small current is drawn from source +E via rectifier D9, and thence via winding 32 and resistor R4 to the negative power pulse source 33; and this current flow through winding 32 is in a direction which tends to assure that core 30 remains adjacent its positive saturation region. In effect, the small current flow in winding 32 during the time interval *t2* to *t3* acts as a "tickler" current, which tends to overcome any reverse transient currents which may flow during the said time interval *t2* to *t3*, and as a result, the combined effects of currents flowing during this time interval will tend to cause core 30 to reside slightly above positive remanence, for instance at a point such as 13 (see Figure 1).

During the next subsequent time interval *t3* to *t4*, the power pulse source 33 once more goes positive, and blocking pulse source 36 goes negative, whereby the operation described in reference to the time interval *t1* to *t2* is repeated; and core 30 is again driven into its positive saturation region 12, thereby to produce an appreciable output pulse at terminal 34. As a result, and so long as no input signal appears from source 35, core 30 is regularly driven into positive saturation during each positive-going drive pulse of source 33, whereby regularly spaced pulses appear at the output terminal 34.

If during a time interval such as *t4* to *t5*, an input pulse should be produced by source 35, this input pulse will effect current flow via rectifier D8, and resistor R4 to the negative power pulse source 33; and will also effect current flow via rectifier D8, winding 32, and resistor R5, to the said negative power pulse source 33. The current so flowing through winding 32 in response to application of an input pulse to this winding, causes core 30 to be flipped from the region 11 or 13, to negative remanence point 10, whereby a next subsequent positive-going power pulse, occurring for instance during the time interval *t5* to *t6*, finds winding 31 to present a relatively high impedance. As a result, this next positive-going power pulse merely serves to flip core 30 back toward its positive remanence point 11, without producing any appreciable output; and any sneak output which might occur is again suppressed by the clamp circuit including rectifier D7.

Thus, examining the waveforms of Figure 5, it will be seen that the circuit of Figure 4 produces regularly occurring output pulses in the absence of inputs, and occurrence of an input pulse serves to inhibit an output pulse from the system, whereby the circuit may be said to exhibit complementing operation. This operation is again achieved in an improved manner through the use of an input circuit so associated with the power pulse source that the said power pulse source itself acts to block the input during appropriate time intervals; and in addition, as was the case in the arrangement of Figure 2, the circuit employs blocking pulses in the amplifier output thereby to assure complete disconnection of the power rectifier D6 at desired times.

While a separate potential source +E has been utilized in the arrangement of Figure 4, it will be appreciated that the primary purpose of this potential source is to provide a "tickler" current at appropriate times, which tickler current tends to overcome any transient current which might flow in the output winding as a result, for instance, of leakage through power rectifier D6. Rather than employing a steady state potential source, such as +E, an arrangement analogous to that shown in Figure 2 may be employed, in which event the blocking pulse source also provides the desired tickler source; and such an alternative arrangement is shown in Figure 4A. In this particular arrangement, blocking source 36 is, as before, coupled to the amplifier output 34 via rectifier D10; and the said source 36 is also coupled to rectifier D9 via a further impedance such as resistor R6. It will be recalled from the discussion of Figure 4, that tickler current is caused to flow in an upward direction through winding 32 during negative-going excursions of power pulse source 33; and in the arrangement of Figure 4A, the blocking pulse source 36 assumes a positive potential during such negative-going excursions of the power source 33. As a result, these positive excursions of the blocking pulse source may be used in place of the steady state source +E, previously described; and the overall system accordingly operates in the manner already described in reference to Figure 4.

While I have thus described preferred embodiments of the present invention, many variations will be suggested to those skilled in the art; and it must therefore be emphasized that the foregoing description is meant to be illustrative only, and should not be considered limitative of my invention. All such modifications and variations as are in accord with the principles of the present invention are meant to fall within the scope of the appended claims.

Having thus described my invention, I claim:

1. In combination, a magnetic amplifier having an input and an output, means for applying input signals to said input, said amplifier including a first alternating power source for selectively producing output signals at said amplifier output under the control of said input signals, said first alternating power source including positive-going and negative-going potential excursions of substantially equal magnitudes, and means rendering the waveforms of said first power source effectively asymmetrical comprising a second alternating source coupled to said amplifier output, the signal of said second alternating source being at the same frequency as that of said power source, having a lower peak-to-peak amplitude than that of said first power source and tending to combine in aiding fashion with the signal of said first power source only during alternate cycle portions.

2. The combination of claim 1 including means coupling said first alternating power source to said amplifier input whereby predetermined polarity excursions of said first power source prevent the coupling of input signals to said amplifier input.

3. The combination of claim 2 wherein said amplifier input comprises a winding, said input signals being coupled to one end of said winding, and means coupling said second alternating source to the other end of said winding.

4. The combination of claim 2 wherein said amplifier includes a single core of magnetic material exhibiting a substantially rectangular hysteresis loop.

5. A pulse type magnetic amplifier comprising a core of magnetic material having an input and an output winding thereon, an energization source for supplying alternating signals coupled to one end of said output winding, an output circuit coupled to the other end of said output winding, rectifier means in series with said output winding between said energization source and said output circuit whereby predetermined polarity excursions of said signals supplied by said energization source selectively produce output signals at said output circuit in dependence upon the hysteretic operating region of said core, and opposite polarity excursions of said signals supplied by said energization source blocking said rectifier thereby to render said rectifier means non-conductive, a source of input signals coupled to said input winding, input signals from said input source being out of phase with said signals from said energization source whereby said input signals control selectively the hysteretic region over which said core operates during said predetermined excursions of said signals supplied by said energization source, and means for supplying blocking pulses, said blocking pulse means comprising a further source for supplying alternating pulses in phase opposition to said pulses supplied by said energization source, said further source being coupled to said output circuit by means of a further rectifier so that pulses from said blocking pulse means aid the blocking effect of said opposite polarity pulses from said energization source.

6. A magnetic amplifier comprising a core of magnetic material having an input winding and an output winding thereon, an alternating energization source coupled to one end of said output winding, an output circuit coupled to the other end of said output winding, rectifier means in series with said output winding between said energization source and said output circuit whereby predetermined polarity power excursions of said energization source selectively produce output signals at said output circuit in dependence upon the hysteretic operating region of said core, and opposite polarity excursions of said energization source block said rectifier means to thereby render said rectifier means non-conductive, a source of input signals coupled to said input winding to selectively control the hysteretic region over which said core operates during said power excursions of said energization source, means for increasing the blocking effect of said opposite polarity excursions of said energization source comprising a further alternating source coupled to said output circuit, said further alternating source being in phase opposition to said energization source, and means coupling said energization source to said input winding whereby selected polarity excursions of said energization source act as blocking pulses to disconnect said input winding from said source of input signals.

7. A magnetic amplifier comprising a core of magnetic material having an input winding and an output winding thereon, an alternating energization source having an output terminal coupled to one end of said output winding, first impedance means coupling said energization source output terminal to one end of said input winding, second impedance means coupling said energization source output terminal to the other end of said input winding, an output circuit coupled to the other end of said output winding, rectifier means in series with said output winding between said energization source and said output circuit whereby predetermined polarity power excursions of said energization source selectively produce output signals at said output circuit in dependence upon the hysteretic operating region of said core, and opposite polarity blocking excursions of said energization source render said rectifier means non-conductive, a source of input signals coupled to said input winding to selectively control the hysteretic region over which said core operates during said power excursions of said energization source, and means for increasing the blocking effect of said opposite polarity excursions of said energization source comprising a further alternating source coupled to said output circuit, said further alternating source being in phase opposition to said energization source.

8. The amplifier of claim 7 including rectifier means coupling said source of input signals to said one end of said input winding, and a potential source coupled to the said other end of said input winding.

9. The amplifier of claim 7 including rectifier means coupling said source of input signals to said one end of said input winding, and further rectifier means coupling said further alternating source to said other end of said input winding.

10. In combination, a magnetic amplifier including a core of magnetic material having an input winding and an output winding thereon, an alternating driving source coupled to one end of said output winding for regularly applying drive to said output winding, an output circuit coupled to the other end of said output winding, a source of selective input signals coupled to one end of said input winding, a potential source coupled to the other end of said input winding, and control means comprising impedance means interconnecting the opposing ends of said input winding to a common output terminal of said driving source to be driven thereby so that said driving source inhibits the application of input signals to said input winding while drive is being applied to said output winding.

11. The combination of claim 10 wherein said alternating source produces an output which is of substantially sinusoidal configuration.

12. The combination of claim 11 wherein said potential source produces an output which is also of substantially sinusoidal configuration, the output of said potential source being in phase opposition to the output of said driving source.

13. The combination of claim 12 including means coupling said potential source to said output circuit.

14. The combination of claim 13 wherein said core comprises a magnetic material exhibiting a substantially rectangular hysteresis loop.

15. In a magnetic amplifier, the combination of a magnetic core, an input winding, an output winding, means for applying blocking pulses to a first terminal of said input winding and to a first terminal of said output winding, said first terminal of said output winding being connected to an output terminal, means for selectively applying input pulses to a second terminal of said input winding, means for applying power pulses to a second terminal of said output winding, said blocking pulses and said power pulses combining in asymmetrical fashion, first impedance means interconnecting said means for applying said input pulses and said means for applying said power pulses, second impedance means interconnecting said means for applying said power pulses and said means for applying said blocking pulses so that an input pulse tends to inhibit a blocking pulse.

16. In the combination recited in claim 15, said blocking pulses having opposite phase relative to said power pulses, and said blocking pulses being smaller in magnitude than said power pulses.

References Cited in the file of this patent

UNITED STATES PATENTS

| | | |
|---|---|---|
| 2,725,549 | Dunnet | Nov. 29, 1955 |
| 2,830,198 | Eckert et al. | Apr. 8, 1958 |